US010865147B2

(12) United States Patent
Barbato et al.

(10) Patent No.: US 10,865,147 B2
(45) Date of Patent: Dec. 15, 2020

(54) HIGH STRENGTH CONCRETE-LIKE FLUOROGYPSUM-BASED BLENDS AND PRODUCTION METHODS

(71) Applicants: Michele Barbato, Baton Rouge, LA (US); Yasser Bigdeli, Baton Rouge, LA (US); Maria Teresa Gutierrez-Wing, Baton Rouge, LA (US); Charles Davis Lofton, Baton Rouge, LA (US)

(72) Inventors: Michele Barbato, Baton Rouge, LA (US); Yasser Bigdeli, Baton Rouge, LA (US); Maria Teresa Gutierrez-Wing, Baton Rouge, LA (US); Charles Davis Lofton, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 16/129,515

(22) Filed: Sep. 12, 2018

(65) Prior Publication Data
US 2019/0077712 A1    Mar. 14, 2019

Related U.S. Application Data

(60) Provisional application No. 62/557,735, filed on Sep. 12, 2017.

(51) Int. Cl.
| | |
|---|---|
| *C04B 28/16* | (2006.01) |
| *C04B 7/02* | (2006.01) |
| *C04B 7/13* | (2006.01) |
| *C04B 7/153* | (2006.01) |
| *C04B 28/14* | (2006.01) |
| *C04B 103/00* | (2006.01) |

(52) U.S. Cl.
CPC ............... *C04B 28/16* (2013.01); *C04B 7/02* (2013.01); *C04B 7/13* (2013.01); *C04B 7/1535* (2013.01); *C04B 28/142* (2013.01); *C04B 2103/0088* (2013.01); *C04B 2201/50* (2013.01)

(58) Field of Classification Search
CPC ........... C04B 7/02; C04B 7/13; C04B 7/1535; C04B 28/142; C04B 28/16; C04B 2103/0088; C04B 2201/50
See application file for complete search history.

(56) References Cited

U.S. PATENT DOCUMENTS

| 4,615,809 A | 10/1986 | King |
| 4,935,211 A | 6/1990 | Azar |
| 6,517,790 B1 | 2/2003 | Eisele |

FOREIGN PATENT DOCUMENTS

| CN | 102219465 A | * | 10/2011 |
| CN | 103626422 A | * | 3/2014 |
| CN | 106187003 A | * | 12/2016 |
| CN | 106747192 A | * | 5/2017 |
| CN | 106938909 A | * | 7/2017 |
| CN | 107032723 A | * | 8/2017 |

OTHER PUBLICATIONS

Gao et al, "Integrated Utilization of Ultra-Fine Fly Ash—Fluorogypsum for Highway Repair", Key Engineering Materials, vols. 302-303, pp. 255-262, ISSN:1662-9795. (Year: 2006).*
Yan et al. "The cementitious binder derived with fluorogypsum and low quality of fly ash", Cement and Concrete Research 30, pp. 275-280. (Year: 2000).*
ASTM (2008). ASTM C403/C403M-08 Standard test method for time of setting of concrete mixtures by penetration resistance. ASTM International, West Conshohocken, PA, USA. DOI: 10.1520/C0403-00403M-08.
ASTM (2010). ASTM D2216-10 Standard test methods for laboratory determination of water (moisture) content of soil and rock by mass. ASTM International, West Conshohocken, PA, USA. DOI: 10.1520/D2216-10.
ASTM (2013). ASTM C642-13 Standard test method for density, absorbtion, and voids of hardened concrete. ASTM International, West Conshokocken, PA, USA. DOI: 10.152/C0642-13.
ASTM (2013). ASTM D4972-13 Standard test method for pH of soils. ASTM International, West Conshohocken, PA, USA. DOI: 10.1520/D4972-13.
ASTM (2014). ASTM C305-14 Standard test method for mechanical mixing of hydraulic cement pastes and mortars of plastic consistency. ASTM International, West Conshohocken, PA, USA. DOI: 10.1520/C0305-14.
ASTM (2014). ASTM C469/C469M-14 Standard test method for static modulus of elasticity and Poisson's ratio of concrete in compression. ASTM International, West Conshohocken, PA, USA. DOI: 10.1520/C0469-00469M-14.
ASTM (2016). ASTM C192/C192M-16a Standard practice for making and curing concrete test specimens in the laboratory. ASTM International, West Conshohocken, PA, USA. DOI: 10.1520/C0192-C0192M-16A.
ASTM (2016). ASTM C39/C39M-16b Standard test method for compressive strength of cylindrical concrete specimens. ASTM International, West Conshohocken, PA, USA. DOI: 10.1520/C0039-C0039M-16B.
ASTM (2017). ASTM C1005-17 Standard test method for reference masses and devices for determining mass and volume for use in the physical testing of hydraulic cements. ASTM International, West Conshohocken, PA, USA. DOI: 10.1520/C1005-17.
Bigdeli, Y., Barbato, M., Gutierrez-Wing, M. T., Lofton, C. D., Rusch, K. A., Jung, J., and Jang, J. "Development of new pH-adjusted FG-cement-fly ash blends: Preliminary investigation of strength and durability properties." Construction and Building Materials, (2018) 182:644-656. (2018).

(Continued)

*Primary Examiner* — Anthony J Green
(74) *Attorney, Agent, or Firm* — Venable LLP; Keith G. Haddaway (57) ABSTRACT

High-strength concrete-like FG blends and methods for producing them are described. The blend includes FG, hydraulic cement, additional alkali material, and pozzolanic material. The blend further includes an admixture used in the formulation of concrete. The blend further includes an aggregate. The aggregate is a coarse aggregate or a fine aggregate.

8 Claims, 4 Drawing Sheets

(56) References Cited

OTHER PUBLICATIONS

Bigdeli, Y., Barbato, M., Gutierrez-Wing, M. T., and Lofton, C. D. (2018). "Use of slurry FG (FG) with controlled pH-adjustment in FG-based blends." Construction and Building Materials, 163:160-168. https://doi.org/10.1016/j.conbuildmat.2017.12.099.

Brink, R. H. (1973) "Use of waste sulfate on transpo'72 parking lot." Proceedings, Third International Ash Utilization Symposium. Sponsored by National Coal Association, Edison Electric Institute, American Public Power Association, National Ash Association, and Bureau of Mines, Pittsburgh, PA, USA.

Chen, S, Rusch, K, Malone, R, Seals, R, Wilson, C, Fleeger, J. Preliminary evaluation of stabilized phosphogypsum for use within the aquatic environment. In Proceedings of the Water Environment Federation, Special Workshop on Food Chain Toxicity-Toxic Substances in Water Environmental: Assessment and Control. 1995.

Clifton, J. R., Brown, P. W., and Frohnsdorff, G. (1980), "Uses of waste materials and by-products in construction. Part I." Resource Recovery and Conservation, 5(2), 139-160.

Clifton, J. R., Brown, P. W., and Frohnsdorff, G. (1980). "Uses of waste materials and by-products in construction. Part II." Resource Recovery and Conservation, 5(3), 217-228.

Deshpande, PS. The determination of appropriate phosphogypsum: Class C fly ash: Portland type II cement compositions for use in marine applications. Thesis. Louisiana State University. 2003.

Garg, M., and Pundir, A. (2014). "Investigation of properties of FG-slag composite binders-hydration, strength and microstructure." Cement and Concrete Composites, 45(2014), 227-233.

Guo, T, Malone, RF, Rusch, KA. Stabilized phosphogypsum: class C fly ash: Portland type II cement composites for potential marine application. Environmental Science & Technology, 35(19): 3967-3973. 2001.

Guo, T, Malone, RF, Seals, RK, Rusch, KA. Determination of optimal composition of stabilized phosphogypsum composites for saltwater application in Hazardous and industrial wastes proceedings of the Thirty-first Mid-Atlantic Industrial and Hazardous Waste Conference. 1999.

Lind, T. (1999). Ash Formation in Circulating Fluidized Bed Combustion of Coal and Solid Biomass. Ph.D. thesis, Technical Research Centre of Finland, Espoo, Finland.

Nieland, DL, Wilson, CA, Fleecer, JW, Sun, B, Malone, RF, Chen, S. Preliminary evaluation of the use of phosphogypsum for reef substrate. I. A laboratory study of bioaccumulation of radium and six heavy metals in an aquatic food chain. Chemistry and Ecology, 14(3-4): 305-319. 1998.

Singh, M., and Garg, M. (2009). "Activation of FG for building materials." Journal of Scientific and Industrial Research, 68(2), 130-134.

Usmen, M. A., and Moulton, L. K. (1984). "Construction and Performance of Experimental Base Course Test Sections Built with Waste Calcium Sulfate, Lime, and Fly Ash." Transportation Research Record, 998, 52-62.

Wilson, CA, Nieland, DL, Fleecer, JW, Todaro, A, Malone, RF, Rusch, KA. Preliminary Evaluation of the Use of Phosphogypsum for Reef Substrate. ii. A Study of the Effects of Phosphogypsum Exposure on Diversity and Biomass of Aquatic Organisms. Chemistry and Ecology, 14(3-4): 321-340. (1998).

Wu, Z., Zhang, Z., and Tao, M. (2010). "Stabilizing blended calcium sulfate materials for roadway base construction." Construction and Building Materials, 24(10), 1861-1868.

Yan, P., and You, Y. (1998). "Studies on the binder of fly ash-fluorgypsum-cement." Cement and Concrete Research, 28(1), 135-140.

Yan, P., Yang, W., Qin, X., and You, Y. (1999). "Microstructure and properties of the binder of fly ash-FG-Portland cement." Cement and concrete research, 29(3), 349-354.

Zhang, Z., and Tao, M. (2006). Stability of Calcium Sulfate Base Course in a Wet Environment, FHWA/LA.06/419, Louisiana Transportation Research Center, Baton Rouge, LA, USA.

\* cited by examiner

HIGH STRENGTH CONCRETE-LIKE FLUOROGYPSUM-BASED BLENDS AND PRODUCTION METHODS

CROSS REFERENCE TO RELATED APPLICATION

This patent application claims the benefit of U.S. Provisional Patent Application No. 62/557,735 filed Sep. 12, 2017, which is incorporated by reference herein.

FIELD OF THE INVENTION

The present invention relates to high-strength concrete-like fluorogypsum blends and methods for producing them.

BACKGROUND OF THE INVENTION

Fluorogypsum (FG) is an acidic (pH 2.3) by-product of the industrial production of hydrofluoric acid from fluorspar. FG is discharged in slurry form from the producer and placed in settlement ponds until the FG hardens (King 1986; Azar 1990; Chesner et al. 1998). The hardened FG has a low pH and needs to be neutralized in order to avoid potentially harmful properties such as corrosiveness (Chesner et al. 1998). This neutralization can be performed by adding a small amount (e.g., less than about 6% of dry weight) of alkaline material such as lime (e.g., Eisele 2003) or circulating fluidized bed combustion ash (Lind 1999), and obtaining a new material referred to as blended calcium sulfate (Zhang and Tao 2006) or pH-adjusted FG. This material is then stockpiled in mounds, where it is exposed to weather and potential contaminants before it is removed for potential use. The addition of alkaline material and the stockpiling of this material are not subjected to quality control. This material is referred to as uncontrolled pH-adjusted FG hereinafter.

Uncontrolled pH-adjusted FG has been considered for use in construction applications (Brink 1973; Usmen and Moulton 1984; Zhang and Tao 2006; Singh and Garg 2009; Wu et al. 2010). Uncontrolled pH-adjusted FG is readily available, because it is stockpiled by the chemical plants producing hydrofluoric acid; and pure FG cannot be used as is because it presents high levels of acidity and long setting times, which are considered undesirable properties for a construction material (Singh and Garg 2009).

Currently, FG is used only in the form of rocks of different grading (after neutralization and stockpiling) for subgrade of roads and parking lots.

SUMMARY

In an embodiment of the invention, a pre-cure composition includes FG and hydraulic cement. The FG can be in slurry form, such as a wet slurry form or a dry slurry form. The pre-cure composition can include an additional alkali material. For example, the additional alkali material can be lime, a coal combustion product, circulating fluidized bed combustion ash (CFBCA), or a combination.

The pre-cure composition can also include a pozzolanic material. For example, the pozzolanic material can be a solid fuel combustion product, a coal combustion product, fly ash, class C fly ash, class F fly ash, bottom ash, flue-gas desulfurization materials, boiler slag, incinerator bottom ash, a biomass combustion product, bagasse ash, rice hull ash, wood ash, biomass pellets ash, natural pozzolan, volcanic ash, an industrial amorphous silica product, micro-silica, silica fumes, or a combination. In some embodiments, the pozzolanic material is a solid fuel combustion product, a coal combustion product, fly ash, class C fly ash, class F fly ash, bottom ash, flue-gas desulfurization materials, boiler slag, incinerator bottom ash, or a combination thereof. In other embodiments, the pozzolanic material is a biomass combustion product, bagasse ash, rice hull ash, wood ash, biomass pellets ash, or a combination thereof. In still other embodiments, the pozzolanic material is natural pozzolan, volcanic ash, or a combination thereof. In other embodiments, the pozzolanic material is an industrial amorphous silica product, micro-silica, silica fumes, or a combination thereof.

The pre-cure composition can also include an admixture used in the formulation of concrete. For example, the admixture can be a material with latent hydraulic behavior, ground granulated blast furnace slag, a water-reducing agent, entrained air (or another gas), a superplasticizer, a set retarding agent, a set accelerating agent, a shrinkage-reducing agent, or a combination.

The pre-cure composition can also include an aggregate. For example, the aggregate can be a coarse aggregate (such as gravel, crushed stone, or rubble) or a fine aggregate (such as sand).

The solids in the FG can include at least about 10 wt % anhydrite, at least about 25 wt % anhydrite, at least about 50 wt % anhydrite, or at least about 70 wt % anhydrite ($CaSO_4$). The FG can have a pH in the range of from about 1.5 to about 5.5, from about 1.5 to about 5, from about 1.5 to about 3.5, from about 2 to about 3, from about 2 to about 2.8, from about 2 to about 2.6, from about 2.1 to about 2.5, from about 2.2 to about 2.4, from about 2.25 to about 2.35, or of about 2.3.

The pre-cure composition can include hydraulic cement and/o other cementitious materials. For example, the hydraulic cement can be Portland cement, Type I Portland cement, Type II Portland cement, Type III Portland cement, Type IV Portland cement, Type V Portland cement, or a combination.

For example, the pre-cure composition can include at least about 45 wt % FG, at most about 10 wt % hydraulic cement (e.g., from about 0.01 wt % to about 10 wt %), at most about 12 wt % additional alkali material (e.g., from about 0.01 wt % to about 12 wt %), and at most about 40 wt % pozzolanic material (e.g., from about 0.01 wt % to about 40 wt %). For example, the pre-cure composition can include from about 58 to about 62 wt % FG, from about 0 (e.g., 0.01 wt %) to about 4 wt % circulating fluidized bed combustion ash, from about 34 to about 35 wt % fly ash, and from about 3 to about 6 wt % Portland cement. For example, the pre-cure composition can include at least about 5, 10, 15, 20, 25, 30, 35, 40, 45, 50, 55, 60, 65, 70, 75, 80, 85, 90, 95, or 98 wt % FG. For example, the pre-cure composition can include at most about 1, 2, 3, 4, 5, 6, 7, 8, 9, 10, 11, 12, 15, 20, 25, 30, 35, 40, 45, 50, 55, 60, 65, 70, 75, 80, 85, or 90 wt % hydraulic cement (e.g., from about 0.01 wt % to about 90 wt %). For example, the pre-cure composition can include at most about 1, 2, 3, 4, 5, 6, 7, 8, 9, 10, 11, 12, 15, 20, 25, 30, 35, 40, 45, or 50 wt % additional alkali material (e.g., from about 0.01 wt % to about 50 wt %). For example, the pre-cure composition can include at most about 1, 2, 3, 4, 5, 6, 7, 8, 9, 10, 11, 12, 15, 20, 25, 30, 35, 40, 45, 50, 55, 60, 65, 70, 75, 80, 85, 90, or 95 wt % pozzolanic material (e.g., from about 0.01 wt % to about 95 wt %).

In a method according to the invention, the pre-cure composition is used as a partial or total substitute of cement to produce concrete. For example, the produced concrete can include fine and/or coarse aggregate.

In a process according to the invention, a FG-based concrete-like material is formed by mixing a pre-cure composition according to any embodiment disclosed herein to form a dry mixture, mixing the dry mixture with water to form a wet blend, and allowing the wet blend to cure to yield the FG-based concrete-like material. For example, the FG can be first mixed with the additional alkali material to yield treated FG; and the treated FG can be second mixed with the hydraulic cement to yield the dry mixture. For example, the FG can be first mixed with CFBCA to yield treated FG; the treated FG can be second mixed with fly ash and Portland cement to yield the dry mixture; and the dry mixture can be third mixed with water at a water over dry material ratio of less than about ⅓ to form the wet blend. For example, the FG can be first mixed with the additional alkali material to yield treated FG; the treated FG can be secondly mixed with the pozzolanic material and Portland cement to yield the dry mixture; the dry mixture can be thirdly mixed with the admixture used in the formulation of concrete to yield a second dry mixture; and the second dry mixture can be fourthly mixed with water to yield the wet blend. For example, the FG can be first mixed with the additional alkali material to yield treated FG; the treated FG can be secondly mixed with the pozzolanic material and Portland cement to form the dry mixture; the dry mixture can be thirdly mixed with the aggregate (such as a fine aggregate or a coarse aggregate) to yield an aggregated mixture; and the aggregated mixture can be fourth mixed with water to form the wet blend. For example, the treated FG can have a pH of less than about 2.4, less than about 2.5, less than about 3, less than about 3.5, less than about 4, less than about 5, less than about 6, or less than about 6.5. For example, the treated FG can have a pH of from about 6.5 to about 7. For example, the treated FG can have a pH of from about 6 to about 7.5. For example, the wet blend can be allowed to cure for at least about 28 days to form the FG-based concrete-like material. For example, the FG-based concrete-like material can have a compressive strength of at least at least about 20 MPa, at least about 30 MPa, at least about 40 MPa, at least about 50 MPa, or at least about 60 MPa. For example, the FG can be in a wet slurry form. For example, the FG can be in a dried slurry form.

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without parting from the spirit and scope of the invention. All references cited herein are incorporated by reference as if each had been individually incorporated.

Millions of tons of solid by-product materials are produced every year by chemical industries all over the world. The accumulation of these materials causes substantial societal costs for containment and disposal, including environmental pollution and related economic losses (UNEP 2005). Therefore, finding new beneficial applications for these large reserves of unused and/or underutilized materials is of great interest and provides important opportunities for sustainable economic development. At the same time, the construction industry is always searching for alternative supplies of usable materials in order to curb its carbon footprint, reduce the cost of new projects, and ensure long-term sustainability of the industry itself (Halstead 1979; Clifton et al. 1980a, 1980b; Ciullo 1996; Worrell et al. 2001).

Among the different options that have been investigated in the last few decades, significant attention has been paid to the utilization of gypsum-based by-product materials in the construction industry (Brink 1973; Sajwan et al. 2006; Zhang and Tao 2006). One of these gypsum by-products is FG, which is an acidic by-product of the industrial production of hydrofluoric acid from fluorspar. FG is discharged in slurry form from the producer and placed in settlement ponds until the FG hardens (King 1986; Azar 1990; Chesner et al. 1998). The hardened FG has a very low pH and needs to be neutralized in order to avoid potentially harmful properties such as corrosiveness (Chesner et al. 1998). This neutralization is usually performed by adding a small amount (e.g., about 2% to about 6% of dry weight) of alkaline materials such as pure lime (Eisele 2003) or CFBCA (Lind 1999), and obtaining a new material referred to as blended calcium sulfate (Zhang and Tao 2006) or pH-adjusted FG (Bigdeli et al. 2018a). This material is then stockpiled in mounds, where it is exposed to weather and potential contaminants before it is removed for potential use. The composition of the natural fluorspar, the addition of alkaline materials, and the stockpiling of this material are not subjected to quality control. Thus, different batches of the resulting material can have very different chemical and physical properties even when produced by the same chemical plant. This material is referred to as uncontrolled pH-adjusted FG (U-FG) hereinafter.

However, the usage of U-FG in both experimental research and real-world construction applications is often associated with a wide variability of the experimental results and performance of the materials (Bigdeli et al. 2018a), mainly due to the following issues: (1) the composition of the natural base fluorspar varies between different batches; (2) U-FG can present a high variability in the alkaline material content between different batches and even within the same batch due to the non-uniformity of the lime/CFBCA treatment (both in time and space) and the usage of alkaline materials with different levels of purity; and (3) the chemical, physical, and mechanical properties of U-FG can be influenced by the exposure to contaminants and environmental phenomena, such as temperature changes, precipitation, and freezing/thawing cycles, which depend both on the location and the duration of the stockpiling before use of this material.

FG-based blends can be introduced as binders in which high percentages of Portland cement and low percentages of FG are used. Garg and Pundir (2014) used pure FG mixed with a small (e.g., about 0.5% to about 1.0% in weight) quantity of lime to investigate the feasibility of using a blend of pH-adjusted FG, granulated blast furnace slag, and Portland cement (PC) as a composite binder for outdoor construction applications. Yan and You (1997) and Yan et al.

(1999) also used pure FG mixed with large amounts (i.e., >about 50% of dry weight) of fly ash (FA) and activated with PC to obtain a cementitious binder (Yan and You 1997).

The present invention provides a concrete-like material with a composition of slurry FG (FG) that may be treated using alkali materials (e.g., lime and circulating fluidized bed combustion ash), pozzolanic materials (e.g., metakaolin, microsilica, silica fume, fly ash, rice-husk ask, bagasse ash) and hydraulic cement (e.g., Portland cement), which is referred hereinafter as FG-based blend (Bigdeli et al. 2018b). In some embodiments, the FG-based blend may have a weight percentage of the FG that is greater than a weight percentage of the hydraulic cement. Additional additives commonly used with ordinary concrete (including, but not limited to materials with latent hydraulic behavior such as ground granulated blast furnace slag, superplasticizers, water-reducing agents, air-entrainment, set-retarding/accelerating, shrinkage reducing admixtures) can also be added to the blend. Unlike ordinary concrete, FG-based blend does not need to contain aggregates; however, it can be used as a direct substitute of ordinary concrete in construction applications. The present invention offers an alternative production method and a set of compositions with high compressive strength, high FG content, and low Portland cement content (Bigdeli et al. 2018b). The high compressive strength is a highly desirable property for construction applications, whereas minimizing the amount of Portland cement in the composition results in lower production costs.

The invention describes the compositions and methods used to produce a concrete-like material that can be used as a substitute of ordinary concrete. This invention uses slurry FG, which is currently considered an industrial waste.

The present invention introduces a method to: (1) use slurry FG (FG) as produced by chemical plants, (2) treat its pH with small amounts of alkali materials (less than or equal to the amount needed for full neutralization), (3) mix the treated FG (e.g., ≤about 50% in weight of the dry material) with hydraulic cement (e.g., about ≤10% in weight of the dry material) and pozzolanic materials (e.g., about ≤40% in weight of the dry material), and (4) mix with water at a water over dry material ratio lower than about ⅓. The obtained material, referred to as FG-based blend, has a high compressive strength (e.g., from about 20-about 50 MPa-about 3000-about 7000 psi) and modulus of elasticity (e.g., from about 18-about 21 GPa-about 2600-about 3000 ksi). FG-based blends can be used as direct substitute of ordinary unreinforced concrete in construction applications.

As disclosed herein, embodiments of the FG-based blend comprises at least about 45 wt % FG, and at most about 10 wt % (e.g., from about 0.01 wt % to about 10 wt %) hydraulic cement. The FG-based blend may further comprise at most about 2 wt % (e.g., from about 0.01 wt % to about 2 wt %) additional alkali material. In addition, the FG-based blend may also comprise at most 40 wt % (e.g., from about 0.01 wt % to 40 wt %) pozzolanic material.

In some embodiments, the FG-based blend comprises from about 60 wt % to about 90 wt % FG, from about 0 wt % (for example about 0.01 wt %) to about 38 wt % FA and from about 2 wt % to about 10 wt % hydraulic cement, such as Portland cement The FG-based blend can develop compressive strength, modulus of elasticity, and setting time that are similar to those of ordinary concrete, with a lower unit weight (e.g., from about 1800-about 2100 kg/m$^3$) and lower amounts of hydraulic cement, which corresponds to lower emission of $CO_2$ during the production of this material. The FG-based blend that is the subject of this application enables higher usage of by-product FG, which contributes to the sustainability of this material and minimizes costs associated with FG neutralization and stockpiling, because it directly uses the slurry FG.

Embodiments of the invention represent a lower-cost alternative to ordinary Portland cement concrete. In terms of cost per unit volume (cubic yard), embodiments can be produced at a cost of about $50-about 65/cu yd., less than a typical cost of about $75/cu yd. of ordinary concrete.

The FG-based blend according to the invention can be used as a direct substitute of unreinforced concrete in several applications, including (but not limited to): bearing walls, earth retaining walls, slab-on-grade construction, shallow foundation elements not requiring steel reinforcement, etc.; concrete blocks, concrete panels, pre-fabricated elements, etc.; road pavement, pavement for parking lots and walking areas, sidewalks, etc.; coastal protection structures such as sea walls and water breakers; and as a bagged construction material for small jobs in dry powder form (similar to concrete mix bags).

The mechanical and durability properties of embodiments of the invention, that is, blends made of FG (FG) with the pH adjusted by using controlled amounts of CFBCA and denoted as C-FG, class C fly ash (FA), and type II Portland cement (PC), have been considered (Bigdeli et al. 2018b). A series of pH tests was conducted on samples of C-FG to develop an analytical relationship between acidity and CFBCA content, which can be used to determine the optimal amount of CFBCA needed to obtain a specified pH value. Two compositions of C-FG-based blends were investigated in detail to identify the effects of CFBCA content on compressive strength, modulus of elasticity, Poisson's ratio, relative volumetric expansion, unit weight, and setting times (Bigdeli et al. 2018b). The obtained properties were compared with those of FG-based blends having the same composition and made using FG with the pH adjusted by using uncontrolled amounts of CFBCA (U-FG). Results suggest that the amount of CFBCA can have significant effects on the properties of C-FG-based blends, depending on the composition. In addition, C-FG-based blends generally achieve a higher compressive strength and initial stiffness than the corresponding U-FG-based blends (Bigdeli et al. 2018b).

The addition of controlled amounts of CFBCA to FG in slurry form, to obtain pH-adjusted FG, referred to as controlled pH-adjusted FG (C-FG) hereinafter, for the production of FG-blends containing PC and FA was considered. CFBCA was considered, as well as lime, because CFBCA is a cheaper alternative to lime. The FG-based blends made by utilizing this C-FG material are referred to as C-FG-based blends, in order to distinguish them from FG-based blends made by using U-FG material, which are referred to as U-FG-based blends hereinafter.

There are the following advantages of using C-FG-based blends versus U-FG-based blends: (1) the sources of variability for the mechanical and physical properties of C-FG are reduced to the natural variability of the base fluorspar only, which allows for the production of construction materials with reproducible properties; (2) the quality control for construction materials made using C-FG is easier to implement than that for materials made using U-FG; and (3) the production costs of C-FG-based blends can be reduced when compared to that of U-FG-based blends, because the costs associated with pH neutralization, stockpiling, and maintenance can be minimized or avoided. Thus, embodiments according to the invention represent the development of an economical and sustainable substitute of ordinary concrete using the industrial by-product FG.

Figure 1:
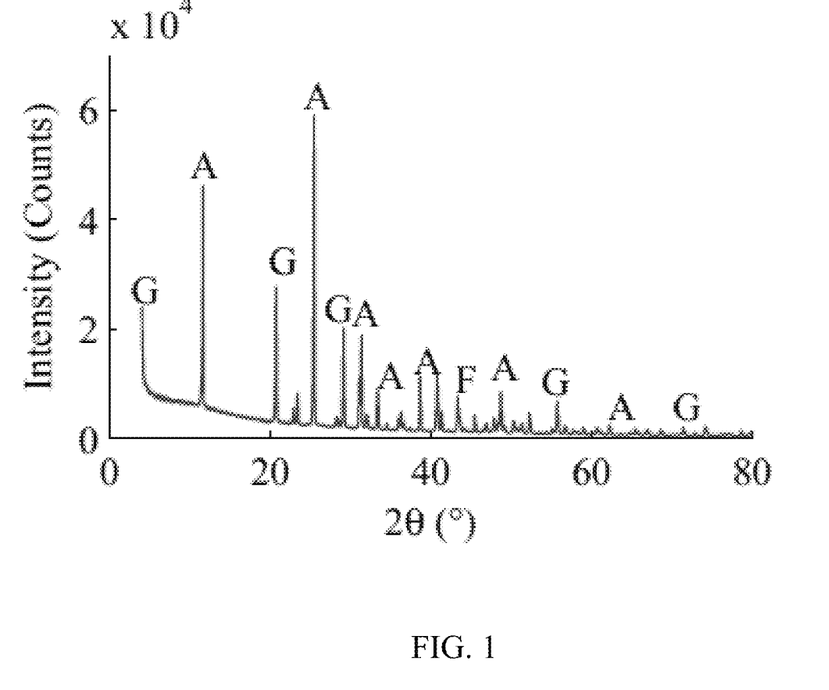
FIG. 1 illustrates X-ray diffractogram of an FG sample (G: gypsum, A: anhydrate, F: fluorite).

Experimental tests show that the slurry FG used may have a water content of about 20% by weight and a pH of about 2.28. The slurry FG used in this research is left to air dry and solidify for four days and then is ground and sieved by using a US standard sieve #10 (corresponding to a maximum particle size of about 2 mm). A sample of FG is analyzed using X-ray Diffraction (XRD) to identify its crystallographic composition, as shown in FIG. 1. The Rietveld analysis (Young 1993) of the XRD pattern indicates that the material quantitatively contains about 74% of anhydrite (A), about 24% of gypsum (G), about 1% of fluorite (F), and about 1% of other materials, as reported in Table 1.

TABLE 1

Crystallographic compositions of FG, CFBCA, FA, and PC by weight percentage (%).

| Components | FG (%) | CFBCA (%) | FA (%) | PC (%) |
|---|---|---|---|---|
| Akermanite: $Ca_2Mg(Si_2O_7)$ | — | — | 32.6 | — |
| Alite: $3CaO \cdot SiO_2$ | — | — | — | 70.4 |
| Anhydrite: $CaSO_4$ | 74.6 | — | 6.8 | — |
| Brownmillerite: $Ca_2(Al,Fe)_2O_5$ | — | — | 29.4 | 23.3 |
| Calcite: $CaCO_3$ | — | 17.6 | — | — |
| Ettringite: $Ca_6Al_2(SO4)_3(OH)_{12} \cdot 26H_2O$ | — | 6.8 | — | — |
| Fluorite: $CaF_2$ | 1.0 | — | — | — |
| Gypsum: $CaSO_4 \cdot 2H_2O$ | 24.2 | 64.9 | — | 1.4 |
| Periclase: MgO | — | — | 5.9 | — |
| Perovskite: $CaTiO_3$ | — | — | 3.9 | — |
| Portlandite: $Ca(OH)_2$ | — | 4.1 | — | — |
| Quartz: $SiO_2$ | 0.1 | 5.9 | 20.3 | — |
| Tricalcium Aluminate: $3CaO \cdot Al_2O_3$ | — | — | — | 4.9 |

Figure 2:
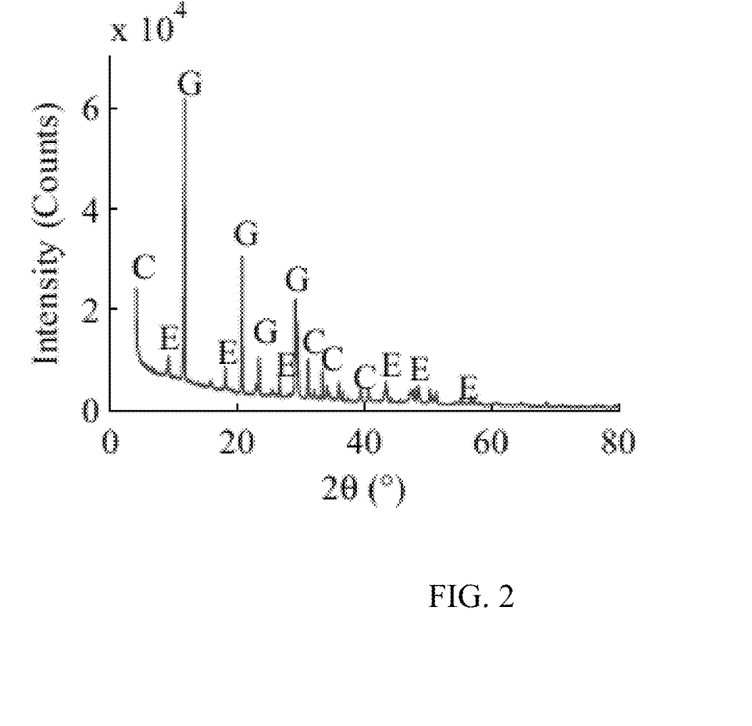
FIG. 2 illustrates X-ray diffractogram of a CFBCA sample (G: gypsum, C: calcite, E: ettringite).

The CFBCA material was produced by burning petroleum coke, tree bark, and limestone in a boiler used for power generation (Lind 1999). The provided material may have a water content of about 20% by weight and a pH of about 12.6. The material is air dried and sieved by using the US standard sieve #10 prior to its use in the experiments. A sample of CFBCA is analyzed using XRD to identify its crystallographic composition, as shown in FIG. 2. The Rietveld analysis of the XRD pattern indicates that the CFBCA contains about 64.9% of gypsum, about 17.6% of calcite (C), about 6.8% of ettringite (E), and about 10.7% of other materials, such as quartz and portlandite.

Table 1 reports the results of a Rietveld analysis of the X-ray Diffraction (XRD) pattern for the FG in slurry form, the U-FG, and the CFBCA. A sample of slurry FG is analyzed using X-ray Diffraction (XRD) to identify its crystallographic composition, as shown in FIG. 1.

The FG used here is slurry FG which is dried and ground before the addition of CFBCA. The dried slurry FG may have a predominance of anhydrite ($CaSO_4$); and the U-FG may have a predominance of gypsum ($CaSO_4 \cdot 2H_2O$). This change in crystallographic composition may be due to the weather exposure of U-FG, rather than to the addition of CFBCA to slurry FG.

Effects of CFBCA on the Properties of C-FG-Based Blends

Two particular compositions of the C-FG-based blends are selected to investigate the effects of CFBCA amounts on the mechanical and physical properties of interest (Bigdeli et al. 2018b). Hereinafter, each composition is identified by a letter indicating the type of pH-adjusted FG employed (namely, C denotes C-FG and U denotes U-FG), and by three numbers in parentheses separated by hyphens and indicating the weight percentages of C-FG/U-FG, FA, and PC, respectively. The two compositions considered are C(60-34-6) and C(62-35-3), and their properties are compared with those of U(60-34-6) and U(62-35-3).

In order to investigate the effects of the CFBCA content on the properties of the C-FG-based blends, seven mixtures of FG and CFBCA were prepared, with amounts of CFBCA ($w_{CFBCA}$) varying between about 0% and about 12% with intervals of about 2% (see Table 2). For the U-FG-based blends, the specific amount of CFBCA could not be determined; however, the amount of CFBCA is between about 2% and about 6% (G. Mitchell, Brown Industries, personal communication).

TABLE 2

C-FG mixtures used to study the effects of CFBCA content on the properties of C-FG-based blends.

| Mixture | FG (%) | $w_{CFBCA}$ (%) |
|---|---|---|
| $C-FG_1$ | 100 | 0 |
| $C-FG_2$ | 98 | 2 |
| $C-FG_3$ | 96 | 4 |
| $C-FG_4$ | 94 | 6 |
| $C-FG_5$ | 92 | 8 |
| $C-FG_6$ | 90 | 10 |
| $C-FG_7$ | 88 | 12 |

Specimen Preparation and Testing Procedures

The C-FG mixtures listed in Table 2 are prepared by carefully proportioning the dried slurry FG and CFBCA passing a US standard sieve #10. Before sieving, the hardened slurry FG is ground and the CFBCA is air dried. The dry C-FG mixtures are then blended with FA and PC to obtain C(62-35-3) and C(60-34-6) compositions. Finally, the material is mixed with water until a uniform paste is obtained, according to the ASTM C305-14 standard (ASTM 2014a). Specimen preparation and testing procedures followed standard methods used for ordinary concrete.

Sets of five cylindrical specimens of about 10.15 cm×about 20.3 cm (about 4 in×about 8 in) size are prepared following the ASTM C192/C192M-16a standard (ASTM 2016a) using different C-FG-based blends for all tests of mechanical and durability properties, with the exception of the setting time tests, for which three samples of fresh mix are tested per ASTM C403/C403M-08 standard (ASTM 2008). The water content of each blend at the curing condition is determined by following the ASTM D2216 standard (ASTM 2010). Compressive strength, $f_c$, is tested following ASTM C39/C39M-16b (ASTM 2016b); chord modulus of elasticity, E, and Poisson's ratio, v, are tested by following the procedures described in ASTM C469/C469M-14 (ASTM 2014b); relative volumetric expansion, n, is measured following the recommendations of ASTM C1005-17 (ASTM 2017); unit weight (density) is obtained according to ASTM C642-13 (ASTM 2013); and initial and final setting times are determined according to ASTM C403/C403M-08 (ASTM 2008).

Table 3 and Table 4 report the experimental result statistics for compositions C(62-35-3) and C(60-34-6), respectively, in terms of sample means and standard deviations. All results are reported as functions of the CFBCA content in the C-FG mix. Table 3 and Table 4 also report the statistics available for compositions U(62-35-3) and U(60-34-6), respectively. The following subsections discuss the experimental results.

TABLE 3

Statistics of mechanical and physical properties for composition C(62-35-3) made with different C-FG mixes and for composition U(62-35-3).

| $w_{CFBCA}$ (%) | Compressive Strength $\mu_{fc}/\sigma_{fc}$ (MPa) | Unit Weight $\mu_\rho/\sigma_\rho$ (kg/m$^3$) |
|---|---|---|
| 0 | 22.5/0.4 | 1987/1 |
| 2 | 28.1/0.8 | 2008/6 |
| 4 | 30.1/0.8 | 2049/5 |
| 6 | 32.0/1.1 | 2041/7 |
| 8 | 33.6/1.0 | 2048/30 |
| 10 | 33.9/1.5 | 1983/5 |
| 12 | 31.5/0.3 | 1978/27 |
| U-FG | 8.9/0.6 | 1750/7 |

TABLE 4

Statistics of the mechanical and physical properties for composition C(60-34-6) made with different C-FG mixes and for composition U(60-34-6).

| $w_{CFBCA}$ (%) | Compressive Strength $\mu_{fc}/\sigma_{fc}$ (MPa) | Unit Weight $\mu_\rho/\sigma_\rho$ (kg/m$^3$) |
|---|---|---|
| 0 | 51.5/0.6 | 2080/15 |
| 2 | 49.8/0.9 | 2097/8 |
| 4 | 52.7/2.1 | 2048/9 |
| 6 | 45.8/1.9 | 2025/11 |
| 8 | 29.6/1.3 | 1998/17 |
| 10 | 11.7/0.9 | 1887/3 |
| 12 | 7.5/0.4 | 1844/7 |
| U-FG | 13.8/1.5 | NA |

Compressive Strength

Figure 3:
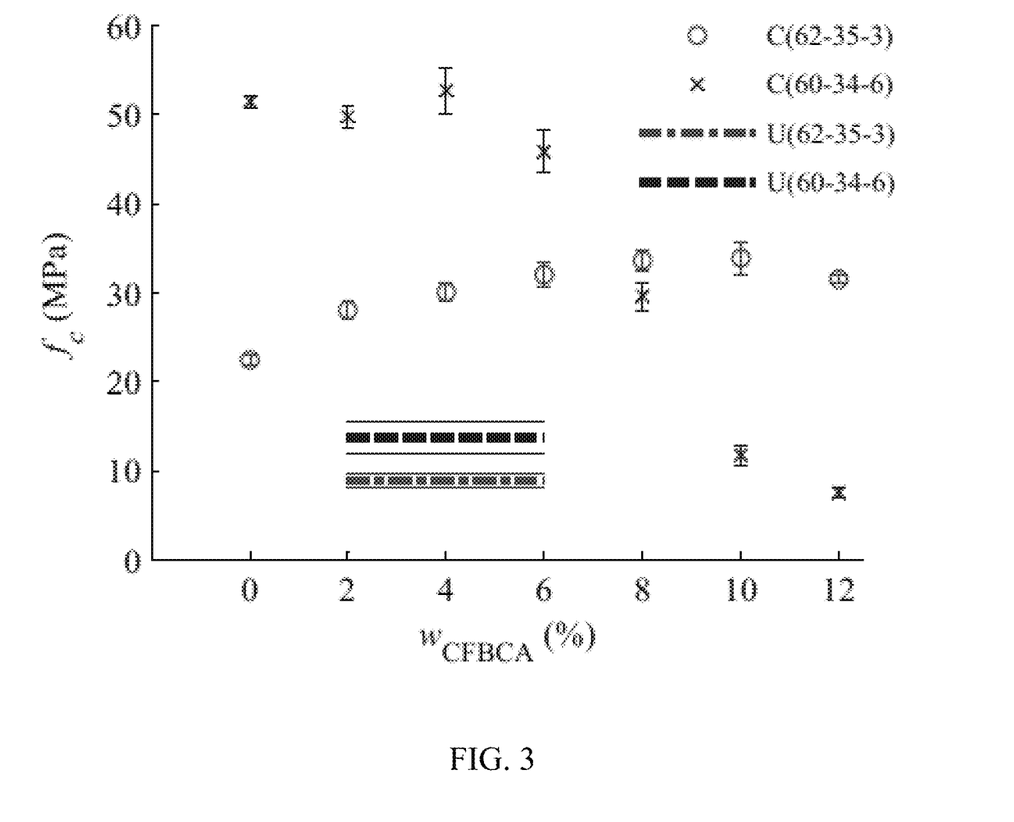
FIG. 3 illustrates effects of CFBCA content on compressive strength of FG-based blends.

FIG. 3 plots the sample mean of the compressive strength, $\mu_{fc}$, together with its about 95% CI as a function of $w_{CFBCA}$ for compositions C(62-35-3) and C(60-34-6). FIG. 3 also reports the compressive strength sample means, as well as their about 95% CI, for compositions U(62-35-3) and U(60-34-6), which are reported over the range about 2%~$w_{CFBCA}$~about 6%, because the exact CFBCA content is unknown. It is observed that: (1) the average compressive strength of composition C(62-35-3) slowly increases from about 22.5 MPa to about 33.9 MPa for $w_{CFBCA}$ increasing from about 0% to about 10% and then slightly decreases to about 31.5 MPa for $w_{CFBCA}$=about 12%; (2) the average compressive strength of composition C(60-34-6) is almost constant for $w_{CFBCA}$~4%, reaches a maximum value of about 52.7 MPa at $w_{CFBCA}$=about 4%, and then decreases dramatically, reaching the value of about 7.5 MPa for $w_{CFBCA}$=about 12%; (3) the average compressive strengths of both compositions U(62-35-3) and U(60-34-6) are equal to about 8.9 MPa and about 13.8 MPa, respectively, and thus are significantly lower (i.e., smaller by a factor greater than 3) than those of the corresponding C-FG compositions in the range about 2%~$w_{CFBCA}$~about 6%; and (4) the lengths of the about 95% CI for all compositions are small (i.e., less than about 4 MPa), which indicates that the estimates of the average compressive strengths are highly reliable.

It is concluded that the compressive strength of C-FG-based blends can experience significant variations for varying amounts of CFBCA and different compositions. It is also concluded that using U-FG has a negative effect on the compressive strength of FG-based blends. Because the chemical analysis of the U-FG used for compositions U(62-35-3) and U(60-34-6) did not identify significant amount of impurities, the results presented here indicate that prolonged weather actions produce this negative effect independently of the amount of CFBCA used to neutralize the FG. It is also observed that, for appropriate values of $w_{CFBCA}$, the C-FG-based blends considered in this study achieve compressive strengths that are compatible with their use as structural construction materials.

Unit Weight

Figure 4:
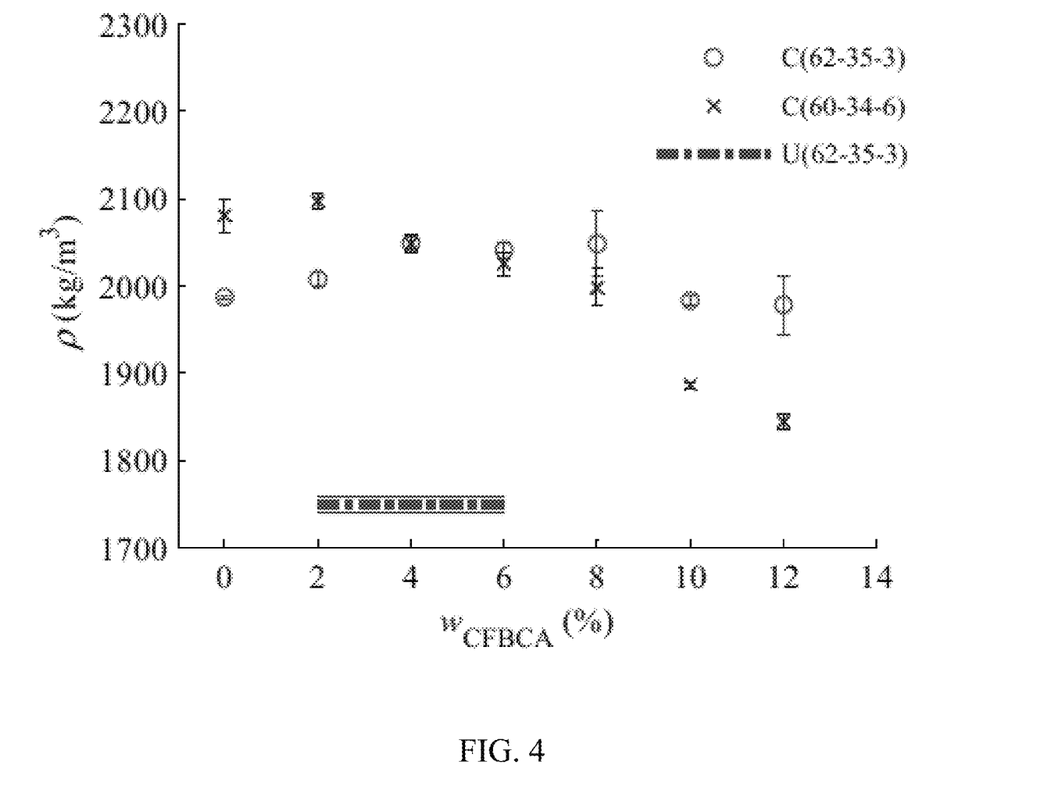
FIG. 4 illustrates effects of CFBCA content on unit weight of FG-based blends.

FIG. 4 plots the sample mean of the unit weight (density), $\mu_\rho$, as a function of $w_{CFBCA}$ for compositions C(62-35-3) and C(60-34-6), as well as for composition U(62-35-3). The corresponding 95% CI are also reported.

For composition C(62-35-3), $\mu_\rho$ slightly increases from about 1987 kg/m3 to about 2049 kg/m3 for $w_{CFBCA}$ increasing from about 0% to about 4%, it remains almost constant for about 4%~$w_{CFBCA}$~about 8% (the differences are not statistically significant for a=about 5%), and decreases to about 1978 kg/m3 for $w_{CFBCA}$=about 12%. For composition C(60-34-6), $\mu_\rho$ slightly increases from about 2080 kg/m3 to about 2097 kg/m3 for $w_{CFBCA}$=about 0% and about 2%, respectively, although this change is not statistically significant with a significance level $\alpha$=5%, and then decreases monotonically to 1844 kg/m3 for $w_{CFBCA}$=about 12%. The average unit weight of the U-FG-based blend made with composition U(62-35-3) is about 1750 kg/m3, which is significantly lower than that of C-FG-based blends.

XRD Results of Raw Materials

A sample of dried slurry FG (FG), i.e., un-treated FG, is analyzed using X-ray Diffraction (XRD) to identify its crystallographic composition. One representative sample of pH-adjusted FG (U-FG) is also analyzed by XRD method. The results for both materials are reported in Table 5. A comparison of the results of XRDs for the two materials shows that the dried slurry FG contains about 74.6% anhydrite (CaSO$_4$) and about 24.2% gypsum (CaSO$_4$.2H$_2$O), whereas the pH-adjusted FG (U-FG) contains only about 5.7% anhydrite and about 93.4% gypsum. Without being bound by theory, this difference may be due to the FG neutralization treatment and to prolonged exposure to contaminants and environmental phenomena.

TABLE 5

Crystallographic compositions of two types of FG (Slurry FG and pH-adjusted FG, U-FG) and CFBCA (% by dry weight).

| Components | Slurry FG | pH-adjusted FG | CFBCA |
|---|---|---|---|
| Akermanite: Ca$_2$Mg(Si$_2$O$_7$) | — | — | — |
| Alite: 3CaO•SiO$_2$ | — | — | — |
| Anhydrite: CaSO$_4$ | 74.6 | 5.7 | — |
| Brownmillerite: Ca$_2$(Al,Fe)$_2$O$_5$ | — | — | — |
| Calcite: CaCO$_3$ | — | — | 17.6 |
| Ettringite: Ca$_6$Al$_2$(SO4)$_3$(OH)$_{12}$•26H$_2$O | — | — | 6.8 |
| Fluorite: CaF$_2$ | 1.0 | 0.8 | — |
| Gypsum: CaSO$_4$•2H$_2$O | 24.2 | 93.4 | 64.9 |
| Periclase: MgO | — | — | — |
| Perovskite: CaTiO$_3$ | — | — | — |
| Portlandite: Ca(OH)$_2$ | — | — | 4.1 |
| Quartz: SiO$_2$ | 0.1 | 0.1 | 5.9 |
| Calcite: CaCO$_3$ | — | — | — |

Additionally, a sample of CFBCA is analyzed using XRD. The Rietveld analysis of the XRD pattern indicated that the CFBCA contains about 64.9% gypsum, about 17.6% calcite, about 6.8% ettringite, and about 10.7% of other materials, such as quartz and portlandite. This material is used as alkali material for pH-adjustment of the FG.

Compressive Strength Results

The compressive strength of the specimens made of pH-adjusted FG, fly ash, and Portland cement (FG, FA, PC), is significantly lower than that of specimens with the same compositions but made using dried slurry FG. For example, the average compressive strengths of compositions (62-35-3) and (60-34-6) are equal to about 8.9 MPa and about 13.8 MPa, respectively, when made using pH-adjusted FG, and to about 30.1 MPa and about 52.7 MPa, respectively, when made using dried slurry FG.

The experimental results presented here show that the content of CFBCA used to neutralize the FG material has a significant effect on the mechanical and physical properties of C-FG-based blends.

The maximum compressive strength is achieved for an optimal amount of CFBCA, which depends on the C-FG-based composition and is in the range about 8%~$w_{CFBCA}$ about 10% for composition C(62-35-3) and about 2%~$w_{CFBCA}$ about 4% for composition C(60-34-6). These observations suggest that a good compromise between mechanical properties and production cost can be obtained using small amounts of CFBCA (i.e., $w_{CFBCA}$ about 4%). For composition C(60-34-6) it may be advantageous to avoid neutralization of the FG (i.e., to use $w_{CFBCA}$=about 0% (e.g., 0.01%)), as long as the low pH is not harmful to the equipment used to grind the dried slurry FG. The results of this investigation also indicate that composition C(60-34-6) with $w_{CFBCA}$ about 4% is a promising material to substitute ordinary concrete in construction applications.

Composition U(62-35-3) provides an average compressive strength equal to about 8.9 MPa, i.e., a reduction in compressive strength of about 68.3% when compared to that of composition C(62-35-3) in the range about 2% $w_{CFBCA}$ to about 6%. Similarly, composition U(60-34-6) has an average compressive strength equal to about 13.8 MPa, with a reduction in compressive strength of about 69.9% when compared to that of composition C(60-34-6) in the range about 2% to about 6% $w_{CFBCA}$. Based also on the other experimental results, and without being bound by theory, it is concluded that a prolonged exposure to environmental actions of the U-FG material has a negative effect on the mechanical and durability properties of U-FG-based blends. This effect appears to be significantly larger than that of different amounts of CFBCA. Therefore, the usage of C-FG should be preferred to the usage of U-FG in the preparation of FG-based blends. In addition, the production of C-FG from slurry FG with small amounts of CFBCA can potentially be done at lower cost than the current procedure of FG neutralization and stockpiling, due to the following: (1) lower amounts of CFBCA than those needed for neutralization of the slurry FG can be used to produce C-FG-based blends, (2) the manufacture process can be streamlined by using directly the dried slurry FG (i.e., avoiding transportation to the stockpile and multiple grinding phases), and (3) the land use for stockpiling can be reduced.

The experimental results show that the C-FG-based blend made using composition C(60-34-6) with $w_{CFBCA}$ of about 4% is a promising sustainable substitute of ordinary concrete. This composition achieves a compressive strength between about 49.8 MPa and about 52.7 MPa, which is higher than the typical range of compressive strength for ordinary concrete, i.e., about 20-about 40 MPa (Mehta and Monteiro 2013). The observed values of strength indicate that the inventive material are appropriate for structural applications.

The inventive compositions can have a unit weight in the range about 2048-about 2080 kg/m³, which is lower than that of normal weight concrete, i.e., about 2400 kg/m³ (Mehta and Monteiro 2013). The low unit weight of C-FG-based blends is an advantageous property for construction applications, because it can reduce the self-weight load. Therefore, the addition of normal weight and/or normal weight coarse aggregates to C-FG-based blends, could be useful.

Utilization of PC in the inventive compositions, i.e., about 6%, is lower than in ordinary concrete, i.e., about 10%-about 15% (Nawy 2000). This property is advantageous, because it indicates that the material can be produced at a lower cost and with a lower $CO_2$ gas release than ordinary concrete, making this material promising as a green substitute of ordinary concrete.

Effects of Composition on the Compressive Strength of C-FG-Based Blends

The effects of composition (in terms of FG, FA, and PC contents) on the compression strength of C-FG-based blends are investigated using 15 different compositions (see Table 6 for percentages of components for the considered compositions). The experimental investigation explores the behavior of C-FG-based blends for about 60%≤FG about≤90%, FA about≤38%, and about 2%≤PC≤about 10%. Two sets of experiments are conducted (for a total of 30 compositions): (1) 15 compositions using slurry FG without neutralization (non-neutralized FG), and (2) the same 15 compositions using slurry FG neutralized using lime (neutralized FG). Hereinafter, each composition is identified by a letter C indicating C-FG, and by three numbers in parentheses separated by hyphens and indicating the weight percentages of C-FG, FA, and PC, respectively.

TABLE 6

Compositions, sample average, and sample standard deviation of the compressive strength of C-FG-based blends with non-neutralized FG and FG neutralized with lime.

| Components amounts for different compositions | | | Non-neutralized FG | Neutralized FG |
|---|---|---|---|---|
| $w_{FG}$ (%) | $w_{FA}$ (%) | $w_{PC}$ (%) | $\mu_{f_c}/\sigma_{f_c}$ (MPa) | $\mu_{f_c}/\sigma_{f_c}$ (MPa) |
| 60 | 38 | 2 | 23.1/0.3 | 23.3/1.0 |
| 60 | 34 | 6 | 30.5/1.3 | 28.6/2.0 |
| 60 | 30 | 10 | 14.3/0.3 | 40.1/1.5 |
| 70 | 28 | 2 | 13.8/0.6 | 19.1/1.7 |
| 70 | 24 | 6 | 24.9/0.5 | 30.3/2.4 |
| 70 | 20 | 10 | 15.9/0.8 | 36.2/2.8 |
| 80 | 18 | 2 | 9.2/0.1 | 14.0/1.0 |
| 80 | 14 | 6 | 13.2/1.0 | 23.0/1.6 |
| 80 | 10 | 10 | 13.7/1.0 | 26.5/1.8 |
| 90 | 8 | 2 | 4.8/0.2 | 4.3/0.3 |
| 90 | 4 | 6 | 6.5/0.1 | 16.6/1.0 |
| 90 | 0 | 10 | 6.8/0.3 | 8.9/0.9 |
| 73 | 25 | 2 | 13.7/0.7 | 17.5/1.1 |
| 62 | 35 | 3 | 21.6/1.6 | 22.7/2.3 |
| 75 | 18 | 2 | 9.9/0.5 | 15.5/0.8 |

Specimen Preparation and Testing Procedures

The 15 C-FG mixtures listed in Table 6 are prepared by carefully blending the dried slurry FG with FA and PC to obtain different compositions of FG-based blends. Before using the dried slurry FG, the hardened slurry FG is ground and is passed through a US standard sieve #10 (about 2 mm). In the case of the neutralized FG, the dried and sieved slurry FG is also mixed with about 0.35% in weight of lime in powder form before mixing with FA and PC. Finally, the material is mixed with water until a uniform paste is obtained, according to the ASTM C305-14 standard (ASTM 2014a). Specimen preparation and testing procedures followed standard methods used for ordinary concrete.

Sets of five equally-built cubic specimens of edge dimension equal to about 50 mm (about 2 in) are prepared following the ASTM C109/C109M-16a standard (ASTM 2016b) for each considered composition of C-FG-based blends. The water content of each blend at the curing condition is determined by following the ASTM D2216 standard (ASTM 2010). The compressive strength, $f_c$, is tested following the ASTM C109/C109M-16a standard (ASTM 2016b).

Table 6 reports the experimental result in terms of sample mean, $\mu_{fc}$, and sample standard deviation, $\sigma_{fc}$, of the compressive strength for the different compositions of C-FG-based blends for both non-neutralized and neutralized FG cases. The small values of the sample standard deviations indicate that the tests have a small variation and, thus, a good reproducibility.

Compressive Strength Results for Non-Neutralized FG Case

The results reported in Table 6 for the compositions made using non-neutralized FG show that, for FG=about 60% and FG=about 70%, the compressive strength reaches its maximum value for PC=about 6%, whereas for FG=about 80% and FG=about 90% the compressive strength increases with the amount of PC. It is also observed that for a given percentage of cement content, the average compressive strength of the C-FG-based blends generally decreases with increasing FG content (with the exception of the average compressive strength for PC=about 10%, which is lower for FG=about 60% than for FG=about 70%). The maximum value of the compressive strength is equal to 30.5 MPa (4,420 psi) and is obtained for composition C(60-34-6), whereas the minimum compressive strength is equal to about 4.8 MPa (about 670 psi) and is obtained for composition C(90-8-2). It is noted here that a compressive strength of about 27.5 MPa (about 4,000 psi) or higher is generally considered appropriate for concrete road pavement construction.

Compressive Strength Results for Neutralized FG Case

The results reported in Table 6 for the compositions made using FG neutralized with lime show that, for FG=about 60%, about 70%, and about 80%, the compressive strength increases for increasing PC amounts; whereas for FG=about 90%, the maximum value of the compressive strength is achieved for PC=about 6%. It is also observed that for a given percentage of cement content, the average compressive strength of the C-FG-based blends generally decreases with increasing FG content (with the exception of the average compressive strength for PC=about 6%, which is lower for FG=about 60% than for FG=about 70%). The maximum value of the compressive strength is equal to about 40.1 MPa (about 5,820 psi) and is obtained for composition C(60-30-10), whereas the minimum compressive strength is equal to about 4.3 MPa (about 620 psi) and is obtained for composition C(90-8-2).

Example 1

Composition 1 (C(62-35-3)) is made of about 62% C-FG with about 4% circulating fluidized bed combustion ash, about 35% fly ash, and about 3% Portland cement. It achieves a characteristic compressive strength of about 20 MPa (about 3000 psi) after about 28 days of curing according to ASTM C39/C39M-16b and an average elastic modulus of about 13 GPa (about 1885 ksi).

Example 2

Composition 2 (C(60-34-6)) is made of about 60% C-FG containing no alkali material, about 34% fly ash, and about 6% Portland cement. It achieves a characteristic compressive strength of about 40 MPa (about 6000 psi) after about 28 days of curing according to ASTM C39/C39M-16b and an average elastic modulus of about 21 GPa (about 3045 ksi).

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

CITATIONS

ASTM (2008). ASTM C403/C403M-08 Standard test method for time of setting of concrete mixtures by penetration resistance. ASTM International, West Conshohocken, Pa., USA. DOI: 10.1520/C0403-00403M-08.

ASTM (2010). ASTM D2216-10 Standard test methods for laboratory determination of water (moisture) content of soil and rock by mass. ASTM International, West Conshohocken, Pa., USA. DOI: 10.1520/D2216-10.

ASTM (2013a). ASTM C642-13 Standard test method for density, absorption, and voids of hardened concrete. ASTM International, West Conshohocken, Pa., USA. DOI: 10.1520/C0642-13.

ASTM (2013b). ASTM D4972-13 Standard test method for pH of soils. ASTM International, West Conshohocken, Pa., USA. DOI: 10.1520/D4972-13.

ASTM (2014a). ASTM C305-14 Standard test method for mechanical mixing of hydraulic cement pastes and mortars of plastic consistency. ASTM International, West Conshohocken, Pa., USA. DOI: 10.1520/C0305-14.

ASTM (2014b). ASTM C469/C469M-14 Standard test method for static modulus of elasticity and Poisson's ratio of concrete in compression. ASTM International, West Conshohocken, Pa., USA. DOI: 10.1520/C0469-00469M-14.

ASTM (2016a). ASTM C192/C192M-16a Standard practice for making and curing concrete test specimens in the laboratory. ASTM International, West Conshohocken, Pa., USA. DOI: 10.1520/C0192-00192M-16A.

ASTM (2016b). ASTM C39/C39M-16b Standard test method for compressive strength of cylindrical concrete specimens. ASTM International, West Conshohocken, Pa., USA. DOI: 10.1520/C0039-00039M-16B.

ASTM (2017). ASTM C1005-17 Standard test method for reference masses and devices for determining mass and volume for use in the physical testing of hydraulic cements. ASTM International, West Conshohocken, Pa., USA. DOI: 10.1520/C1005-17.

Azar, D. G. (1990). "Fluorogypsum waste solidification material." U.S. Pat. No. 4,935,211. U.S. Patent and Trademark Office, Washington, D.C., USA.

Bigdeli, Y., Barbato, M., Gutierrez-Wing, M. T., Lofton, C. D., Rusch, K. A., Jung, J., and Jang, J. (2018a). "Development of new pH-adjusted Fluorogypsum-cement-fly ash blends: Preliminary investigation of strength and durability properties." Construction and Building Materials, 182:644-656.

Bigdeli, Y., Barbato, M., Gutierrez-Wing, M. T., and Lofton, C. D. (2018b). "Use of slurry fluorogypsum (FG) with controlled pH-adjustment in FG-based blends." Construction and Building Materials, 163:160-168. https://doi.org/10.1016/j.conbuildmat.2017.12.099

Brink, R. H. (1973) "Use of waste sulfate on transpo '72 parking lot." Proceedings, Third International Ash Utilization Symposium. Sponsored by National Coal Association, Edison Electric Institute, American Public Power Association, National Ash Association, and Bureau of Mines, Pittsburgh, Pa., USA.

Chen, S, Rusch, K, Malone, R, Seals, R, Wilson, C, Fleeger, J. Preliminary evaluation of stabilized phosphogypsum for use within the aquatic environment. In Proceedings of the Water Environment Federation, Special Workshop on Food Chain Toxicity-Toxic Substances in Water Environmental: Assessment and Control. 1995.

Chesner, W. H., Collins, R. J., and MacKay, M. H. (1998). User Guidelines for Waste and By-Product Materials in Pavement Construction, FHWA-RD-97-148, Rept. No. 480017, Turner-Fairbank Highway Research Center, McLean, Va., USA.

Ciullo, P. A. (1996). Industrial Minerals and Their Uses: a Handbook and Formulary. Noyes Publications, Westwood, N.J., USA.

Clifton, J. R., Brown, P. W., and Frohnsdorff, G. (1980a). "Uses of waste materials and by-products in construction. Part I." Resource Recovery and Conservation, 5(2), 139-160.

Clifton, J. R., Brown, P. W., and Frohnsdorff, G. (1980b). "Uses of waste materials and by-products in construction. Part II." Resource Recovery and Conservation, 5(3), 217-228.

CPRA. Integrated ecosystem restoration & hurricane protection in Coastal Louisiana: Fiscal Year 2014 annual plan. Coastal Protection and Restoration Authority. 190 p. 2013.

Deshpande, P S. The determination of appropriate phosphogypsum: Class C fly ash: Portland type II cement compositions for use in marine applications. Thesis. Louisiana State University. 2003.

Eisele, D. J. (2003). "Converting fluorogypsum to calcium sulfate." U.S. Pat. No. 6,517,790, U.S. Patent and Trademark Office, Washington, D.C., USA.

Fan, Y. Leaching characteristics and structural Integrity of cement-stabilized phosphogypsum PG. Master of Science thesis. Civil and Environmental Engineering, Louisiana State University, Baton Rouge, La. 122.p. 1997.

Garg, M., and Pundir, A. (2014). "Investigation of properties of fluorogypsum-slag composite binders—hydration, strength and microstructure." Cement and Concrete Composites, 45(2014), 227-233.

Guo, T. Determination of optimal composition of stabilized PG composites for saltwater application. Ph.D. thesis. Civil and Environmental Engineering, Louisiana State University, Baton Rouge, La. 320.p. 1998.

Guo, T, Malone, R F, Rusch, K A. Stabilized phosphogypsum: class C fly ash: Portland type II cement composites for potential marine application. Environmental Science & Technology, 35(19): 3967-3973. 2001.

Guo, T, Malone, R F, Seals, R K, Rusch, K A. Determination of optimal composition of stabilized phosphogypsum composites for saltwater application. In Hazardous and Industrial Wastes-Proceedings of the Mid-Atlantic Industrial Waste Conference. 1999.

Halstead, W. (1979). Potential for Utilizing Industrial Wastes and By-Products in Construction of Transportation Facilities in Virginia, FHWA/VA-80/15, National Technical Information Service, Alexandria, Va., USA.

King, G. N. (1986). "Method for stabilization of sludge." U.S. Pat. No. 4,615,809. U.S. Patent and Trademark Office, Washington, D.C., USA.

Lind, T. (1999). Ash Formation in Circulating Fluidized Bed Combustion of Coal and Solid Biomass. Ph.D. thesis, Technical Research Centre of Finland, Espoo, Finland.

Mehta, P. K., and Monteiro, J. M. (2013). Concrete, Structure, Properties and Materials. 4th Edition, McGraw-Hill Education, New York City, N.Y., USA.

Nawy, E. (2000). Reinforced Concrete: A Fundamental Approach. 4th edition, Prentice Hall, Upper Saddle River, N.J., USA.

Nieland, D L, Wilson, C A, Fleecer, J W, Sun, B, Malone, R F, Chen, S. Preliminary evaluation of the use of phosphogypsum for reef substrate. I. A laboratory study of bioaccumulation of radium and six heavy metals in an aquatic food chain. Chemistry and Ecology, 14(3-4): 305-319. 1998.

Rusch, K. A., Guo, T. Searching for optimum composition of phosphogypsum:fly ash:cement composites for oyster catch materials: annual progress report (Project nr 051LSU2759). Gulf Coast Hazardous Substance Research Center. 2003. 24 pp.

Rusch, K. A., Seals, R, K., Guo, T. Development of economically stabilized phosphogypsum composites for saltwater application. FIPR #01-162-182. Florida Institute of Phosphate Research. 1. 2001. 63 pp.

Rusch, K A, Seals, R K, Guo, T, Deshpande, P. Development of economically stabilized phosphogypsum composites for saltwater application. FIPR #01-162-211. Florida Institute of Phosphate Research. 2005. 54 pp.

Rutherford, A. (2011). ANOVA and ANCOVA: a GLM approach. 2nd edition, John Wiley & Sons, Hoboken, N.J., USA.

Sajwan, K. S., Alva, A. K., Punshon, T., and Twardowska, I. (2006). Coal Combustion Byproducts and Environmental Issues, Springer, New York, N.Y., USA.

Singh, M., and Garg, M. (2009). "Activation of fluorogypsum for building materials." Journal of Scientific and Industrial Research, 68(2), 130.

UNEP (2005). Solid Waste Management, United Nations Environment Programme, CalRecovery, Concord, Calif., USA.

USEPA. National Primary Drinking Water Regulations; Radionuclides; Final Rule. 40 CFR Parts 9, 141, and 142. F. Register. Vol. 65(236) 76708-76753 p. 2000.

Usmen, M. A., and Moulton, L. K. (1984). "Construction and performance of experimental base course test sections built with waste sulfate, lime, and fly ash." Transportation Research Record, 998, 52-62.

Wilson, C A, Fleeger, J W, Malone, R F, Rusch, K A, Seal, R K, DeLosReyes, J, A. A., Jones, S C, Nieland, D L. The substrate suitability of phosphogypsum composites for marine habitat enhancement. Final report. Florida Institute of Phosphate Research. FIPR 01-127-164. 1998a. 89 pp.

Wilson, C A, Nieland, D L, Fleecer, J W, Todaro, A, Malone, R F, Rusch, K A. Preliminary Evaluation of the Use of Phosphogypsum for Reef Substrate. ii. A Study of the Effects of Phosphogypsum Exposure On Diversity and Biomass of Aquatic Organisms. Chemistry and Ecology, 14(3-4): 321340. 1998b.

Worrell, E., Price, L., Martin, N., Hendriks, C., and Meida, L. O. (2001). "Carbon dioxide emissions from the global cement industry." Annual Review of Energy and the Environment, 26(1), 303-329.

Wu, Z., Zhang, Z., and Tao, M. (2010). "Stabilizing blended calcium sulfate materials for roadway base construction." Construction and Building Materials, 24(10), 1861-1868.

Yan, P., and You, Y. (1998). "Studies on the binder of fly ash-fluorgypsum-cement." Cement and Concrete Research, 28(1), 135-140.

Yan, P., Yang, W., Qin, X., and You, Y. (1999). "Microstructure and properties of the binder of fly ash-fluorogypsum-Portland cement." Cement and Concrete Research, 29(3), 349-354.

Young, R. A. (1993). The Rietveld Method, Oxford: University Press. ISBN 0-19-855577-6, Oxford, UK.

Zhang, Z., and Tao, M. (2006). Stability of Calcium Sulfate Base Course in a Wet Environment, FHWA/LA.06/419, Louisiana Transportation Research Center, Baton Rouge, La., USA.

The invention claimed is:

1. A process of forming a fluorogypsum-based concrete material, comprising:
mixing fluorogypsum (FG) with circulating fluidized bed combustion ash (CFBCA) to obtain treated FG;
mixing the treated FG with a pozzolanic material and hydraulic cement to form a dry mixture;
mixing the dry mixture with water at a water over dry material ratio of less than about ⅓ to form a wet blend; and
allowing the wet blend to cure to form a fluorogypsum-based concrete material.

2. The process of claim 1, further comprising:
mixing the dry mixture with an admixture used in a formulation of concrete to form a second dry mixture before mixing with the water; and
mixing the second dry mixture with the water to form the wet blend.

3. The process of claim 1, further comprising
mixing the dry mixture with aggregate to form an aggregated mixture before mixing with the water; and mixing the aggregated mixture with the water to form the wet blend.

4. The process of claim 1, wherein the pozzolanic material is fly ash.

5. The process of claim 1, wherein the cement is Portland cement.

6. The process of claim 1, wherein the pozzolanic material is fly ash and the cement is Portland cement.

7. The process of claim 1, wherein an additional alkali material is added.

8. The process of claim 6, wherein an additional alkali material is added.

* * * * *